United States Patent Office.

EDWARD PROBERT, OF SAN FRANCISCO, CALIFORNIA.

PROCESS OF WORKING AURIFEROUS AND ARGENTIFEROUS ARSENIDES AND SULPHIDES.

SPECIFICATION forming part of Letters Patent No. 305,846, dated September 30, 1884.

Application filed April 21, 1884. (No specimens.)

*To all whom it may concern:*

Be it known that I, EDWARD PROBERT, of the city and county of San Francisco and State of California, have invented an Improvement in the Process of Working Auriferous and Argentiferous Arsenides and Sulphides of Iron, Copper, or other Similar Substances, by Litharge or Lead; and I hereby declare the following to be a full, clear, and exact description thereof.

My invention relates to that method or process of working auriferous and argentiferous arsenides and sulphides of iron, or copper, or other similar compounds in which litharge or lead is introduced into them while in a state of fusion for the purpose of extracting from them the precious metals.

My invention consists in a new and useful improvement in said process—namely, stirring the material under treatment by means of an elastic vapor or vapors generated by the action of the molten mass upon a mineral substance or substances within the pot or receptacle in which the material is being treated and without the aid of any mechanical stirring by hand.

The object of my invention I shall now explain.

Whereas the success of this method of treatment by the introduction of litharge or lead into the molten mass depends largely on the thorough and intimate blending and admixture of the lead or litharge with the arsenides, sulphides, or reguline metals under treatment, as set forth in my application, Serial No. 105,858, filed September 7, 1883; and whereas the stirring by hand is a laborious and at best an imperfect means of effecting the object in view, and in some cases an impossible one, as in that of the arsenides of iron, from the corrosive nature of the substances themselves, which rapidly destroy all implements of iron or steel introduced into them for the purpose of stirring, I have invented a method or improvement by which mechanical stirring is rendered altogether unnecessary, and a much more complete blending or mixing of the materials is effected.

The method of proceeding is as follows: Iron pots of a conical shape, about thirty inches deep, thirty inches wide at the top, and rounded off at the bottom spherically to about twelve inches in diameter, each capable of holding fifteen hundred-weight (more or less) of the substance to be treated, are coated internally with a lining of refractory material composed, preferably, of decomposed or pulverized lava, pumice, or other volcanic rock, but when this is not obtainable, of silicious sand with a certain admixture of finely-pulverized limestone or calcareous marl, to which has been added a sufficiency of clayed water, or milk of lime, to work the whole into a paste. After laying on this coating of refractory material (intended, primarily, to protect the pot from the corrosive action of the substance to be treated) to the thickness of about three-quarters of an inch, a further portion of a specially-prepared composition, consisting of coarsely-crushed limestone, dolomite, siderite, or other suitable carbonate mixed with a sufficient quantity of the ordinary composition with which the pot is lined to give it consistency is laid on the bottom of the pot to the thickness of one inch, more or less. The pots thus prepared are placed in a suitable oven or chamber, or a small fire is made inside each pot, to dry the coating, which, however, is not to be baked so as to expel the last portions of moisture, but only so far as to remove the excess of water. When required for use, the pots thus lined and partially dried are placed in succession under the spout of the smelting-furnace containing the substance to be treated in a state of fusion, which is then tapped into them, while at the same time, or immediately afterward, a charge of lead or litharge, preferably granulated, is fed into each pot from a hopper conveniently placed above. The first effect of the molten substance tapped from the furnace into the pot is to convert the small amount of moisture contained in the protective lining of the pot into steam, which, rising upward from the bottom and sides, causes a brisk ebullition in the molten material. This, however, is insufficient of itself to effect the thorough stirring and blending of the contents of the pot necessary to assure a successful result; but no sooner is this first ebullition, due to the escaping steam, over than the limestone, dolomite, or other carbonate fixed in the bottom of the pot, as well as the calcareous matter in the whole lining, begins, under the intense heat of the molten charge, to undergo calcination, and streams of carbon dioxide are sent off, which, rising upward through the molten matter, produce the effect of a small geyser, keeping the charge in a state of ebullition and agitation for a period of time proportionate to the quantity of mineral carbonate or other source of carbon dioxide, originally used in preparing the pot, and thus effecting such a complete blending and intimate admixture of the ingredients as cannot be attained in any other way. The duration of the ebullition, and consequently of the stirring process, may be regulated to any required number of minutes—from five upward—or as long as the molten material continues hot enough to exercise a calcining effect on the limestone, &c., and inasmuch as the carbon dioxide produced comes off in a steady stream without sudden bursts, as from the vapor of water, there is never any danger to the workmen from explosions. After the ebullition is over the pot with its contents is set aside to cool, when the lead settles to the bottom, carrying down with it the precious metals, and when solidified the mass of alloy can be detached from the waste matter and treated by cupellation in the usual way for the separation of the silver and gold.

It will thus be seen that the stirring is effected partly by steam, which, however, can never be made to do the whole work, being too violent in its action and causing explosion when too much moisture has been left in the composition, but chiefly by the carbon dioxide ("carbonic acid," so-called) developed during the calcination of the limestone or other carbonates employed as the source of gas or vapor.

Although I have in this description referred only to the mineral lining of the pot and to mineral substances attached to and practically forming a part of the lining, as generating the elastic vapor or vapors, I do not wish to confine myself strictly to this method, for in the treatment of a number of substances it would be practicable to hold down, introduce, or support in some other manner within the molten mass the suitable mineral substance or substances to effect a similar result as that which I have described.

I am aware that in the operation of poling, in the working of copper and lead, a piece of green wood is thrust into the molten mass and generates steam, to agitate the material, and I am also aware that in the Bessemer steel process air is forced into the material, and in the process of pattinsonizing lead steam is forced in; but my process differs from that of poling, in that the elastic vapor is generated by mineral substances—a distinction highly important in many cases—as, for example, in the working of arsenide of iron, where wood cannot be used at all; and it differs from the steel and pattinsonizing processes in being generated within the pot by the direct action of the molten mass upon the mineral substance.

Having thus described my invention, what I claim as new, and desire to secure by Letters Patent, is—

The process of separating the precious metals from auriferous and argentiferous arsenides and sulphides of iron or copper or other similar compounds, which consists in introducing litharge or lead into the fused material contained in pots or vessels lined with some moistened refractory material, and also containing dolomite, limestone, or other mineral carbonate in the lining, or distinct therefrom, whereby the charge is stirred by means of the action of the molten mass upon the lining of and mineral substance in the pot or receptacle in which it is being treated, substantially as herein described.

In witness whereof I have hereunto set my hand.

EDWARD PROBERT.

Witnesses:
H. C. LEE,
S. H. NOURSE.